(12) United States Patent
Abuelsaad et al.

(10) Patent No.: US 9,705,884 B2
(45) Date of Patent: Jul. 11, 2017

(54) INTELLIGENT ACCESS CONTROL (71) Applicant: International Business Machines Corporation, Armonk, NY (US)

(72) Inventors: Tamer E. Abuelsaad, Somers, NY (US); Jonathan M. Barney, Kingston, NY (US); Carlos A. Hoyos, Brooklyn, NY (US); Robert R. Wentworth, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 14/865,662

(22) Filed: Sep. 25, 2015

(65) Prior Publication Data

US 2017/0093871 A1    Mar. 30, 2017

(51) Int. Cl.
H04L 29/06    (2006.01)

(52) U.S. Cl.
CPC .......... H04L 63/101 (2013.01); H04L 63/104 (2013.01)

(58) Field of Classification Search
CPC ........................... H04L 63/101; H04L 63/104
See application file for complete search history.

(56) References Cited

U.S. PATENT DOCUMENTS

| 6,591,265 | B1 * | 7/2003 | Erickson | G06F 21/316 |
| 7,216,125 | B2 * | 5/2007 | Goodwin | G06F 21/6218 |
| 7,287,222 | B2 * | 10/2007 | Takata | G11B 27/34 |
| | | | | 707/E17.028 |
| 7,308,704 | B2 * | 12/2007 | Vogel | G06F 21/6218 |
| | | | | 726/1 |
| 7,506,371 | B1 | 3/2009 | Ben-Natan | |
| 7,555,482 | B2 | 6/2009 | Korkus | |
| 7,606,801 | B2 | 10/2009 | Faitelson et al. | |
| 8,290,979 | B1 * | 10/2012 | Fernandez | G06F 21/604 |
| | | | | 707/782 |
| 8,321,437 | B2 | 11/2012 | Lim | |
| 9,147,055 | B2 * | 9/2015 | Baikalov | G06F 21/31 |
| 9,189,644 | B2 * | 11/2015 | Kling | G06F 21/6218 |
| 2011/0247046 | A1 * | 10/2011 | Gross | G06F 21/00 |
| | | | | 726/1 |
| 2012/0136936 | A1 | 5/2012 | Quintuna | |

(Continued)

OTHER PUBLICATIONS

Cisco, "Security Configuration Guide: Access Control Lists, Cisco IOS Release 12.4T", Retrieved From http://www.cisco.com/c/en/us/td/docs/ios-xml/ios/sec_data_acl/configuration/12-4t/sec-data-acl-12-4t-book.pdf, Published Aug. 1, 2005.*

(Continued)

*Primary Examiner* — Chau Le
(74) *Attorney, Agent, or Firm* — Kristofer L. Haggerty (57) ABSTRACT

Embodiments of the present invention disclose a method, system, and computer program product for intelligent access control. A computer detects a new user or modifications made to an existing user in an access control list. The computer determines which other users share an attribute with the newly added or modified employee and then determines which asset(s) are associated with the determined group(s). The computer determines the correlation value between the group(s) and the asset. Based on the determined correlation value, the computer determines whether the newly added or modified employee should have access to the asset.

20 Claims, 4 Drawing Sheets

(56) References Cited

U.S. PATENT DOCUMENTS

2013/0246470 A1* 9/2013 Price ................... G06F 21/6218
707/783
2014/0075492 A1* 3/2014 Kapadia ................ G06F 21/604
726/1

OTHER PUBLICATIONS

Disclosed Anonymously, "System call—Attribute based Security control," An IP.com Prior Art Database Technical Disclosure, IP.com No. 000210332, IP.com Electronic Publication: Aug. 30, 2011, 11 pages.
Narayan et al., "Using Authentication, Authorization, and Accounting Services to Dynamically Provision View-Based Access Control Model User-to-Group Mappings," An IP.com Prior Art Database Technical Disclosure, IP.com No. 000202224, Dec. 2010, 39 pages.
Kandala et al., "An Attribute Based Framework for Risk-Adaptive Access Control Models," 2011 Sixth International Conference on Availability, Reliability and Security, IEEE Computer Society, pp. 236-241.

* cited by examiner

INTELLIGENT ACCESS CONTROL

TECHNICAL FIELD

The present invention relates generally to information security, and more particularly to access control lists.

BACKGROUND

Managing access controls in an enterprise is largely a complex task. The access users and systems require on a day to day basis can change based on several different criteria. In this type of environment, following a least privileged model of access is easy to state in practice but difficult to implement, monitor, and enforce over time. Access control lists in an enterprise typically follow the least privileged model where users are only provided access to assets necessary to fulfill their job responsibilities. The issues with the least privileged model in an enterprise is that it is complex and difficult to maintain. While the least privileged model increases asset security by only providing a user the minimum access to assets necessary to perform their task, it is quite common for users to find that to perform their daily jobs they find issues with their access.

SUMMARY

Embodiments of the present invention disclose a method, system, and computer program product for intelligent access control. A computer detects a new user or modifications made to an existing user in an access control list. The computer determines which other users share an attribute with the newly added or modified employee and then determines which asset(s) are associated with the determined group(s). The computer determines the correlation value between the group(s) and the asset. Based on the determined correlation value, the computer determines whether the newly added or modified employee should have access to the asset.

DETAILED DESCRIPTION

Embodiments of the present invention will now be described in detail with reference to the accompanying figures.

Figure 1:
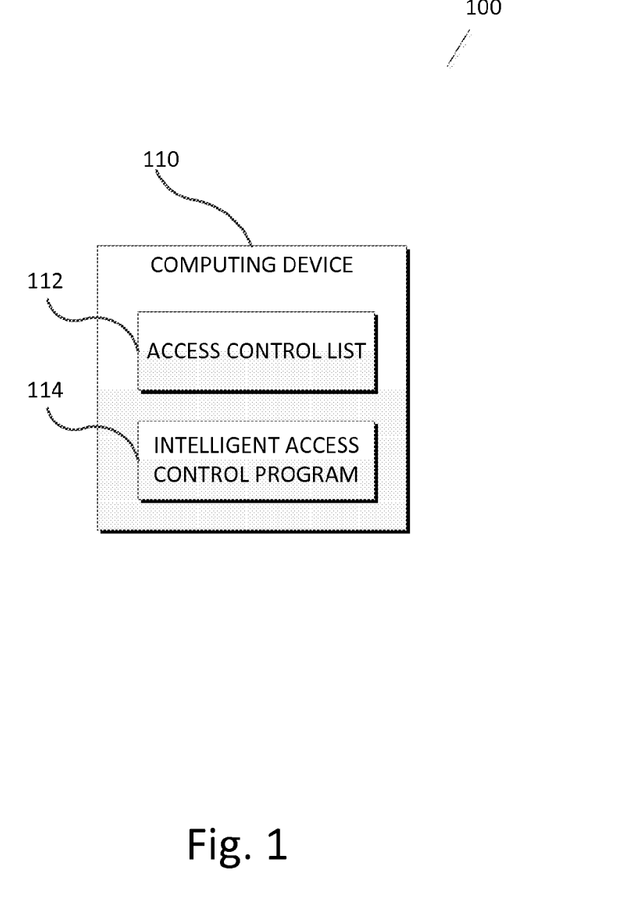
FIG. 1 illustrates intelligent access control system 100, in accordance with an embodiment of the invention.

FIG. 1 illustrates an intelligent access control system 100, in accordance with an embodiment of the invention. In the example embodiment, intelligent access control system 100 includes computing device 110.

Computing device 110 includes access control list 112 and intelligent access control program 114. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Access control list 112 details the access rights of users with regards to assets or resources. In the example embodiment, access control list 112 details information about users (such as employees of an organization) which is used in determining access to an asset and also in grouping together users that possess similar attributes. User information contained in access control list 112 contains demographical information such as employee name, job title, job site, location, department, division, manager, job family, and other job-related attributes. User information contained in access control list 112 also includes information such as identified server connections, community activity, and social interactions through messaging or email. In addition, access control list 112 details the assets to which said users have access to, such as campuses, buildings, rooms, networks, devices, drives, files, folders, data, and the like. Furthermore, access control list 112 details the access rights of a particular user with respect to a particular asset. In the example embodiment, access control list 112 is configured for role-based access control (RBAC) where access is dictated by the role of the user. For example, role-based access control configurations may dictate that all employees with the job title "manager" have access to quarterly earning information while employees with the job title "engineer" do not. In other embodiments, access control list 112 may be configured for rule-based access control where access to an asset is dictated by a set of predefined rules. For example, rule-based access control configurations may dictate that access to a bank vault may only be permitted during the hours of 9:00 AM to 5:00 PM. While in the example embodiment access control list 112 is stored locally on computing device 110, in other embodiments access control list 112 may be stored remotely and accessed via a network.

In the example embodiment, intelligent access control program 114 is capable of detecting when changes are made to the attributes of users in access control list 112, such as detecting when a new user is added to access control list 112 or an attribute of an existing user is modified (referred to as a modified user). Intelligent access control program 114 is further capable of identifying a group of users who share similar attributes with the new added or modified user, such as being part of the same division or sharing a job title. Intelligent access control program 114 is additionally capable of referencing access control list 112 to identify the assets to which each group of users with like attributes have access. Intelligent access control program 114 is further capable of evaluating the strength of the correlation between the group of users with like attributes and a particular asset, then granting access to the asset for a new or modified user if the correlation between the asset and similarly attributed group is sufficiently strong.

Figure 2:
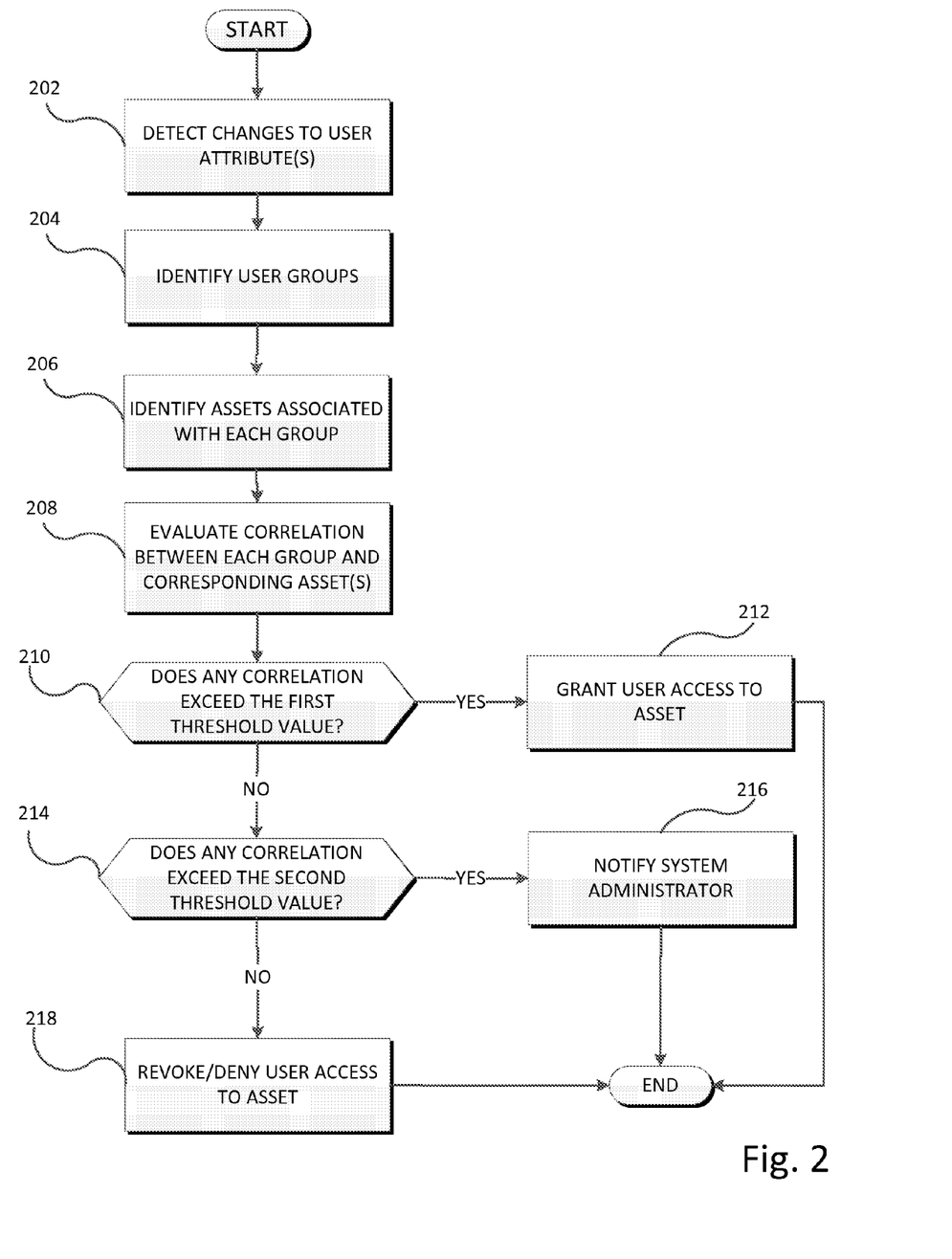
FIG. 2 is a flowchart illustrating the operations of an intelligent access control program 114 of FIG. 1 in determining what assets a newly added employee should have access to, in accordance with an embodiment of the invention.

FIG. 2 is a flowchart depicting the operation of intelligent access control program 114 in modifying user access to an asset based on a correlation found between the asset and similarly attributed employees, in accordance with an embodiment of the present invention.

In the example embodiment, intelligent access control program 114 detects when changes are made to access control list 112 by continuously monitoring access control list 112 (step 202). In the example embodiment, a system administrator modifies the attributes of (associated with) a user in access control list 112 via user input locally on computing device 110 or remotely via a network. In addition to information such as user name and serial number, access control list 112 also includes relevant user information such as job title, job site, location, department, division, manager, job family, identified server connections, community activity, social interactions through messaging/email, and other job-related attributes. For example, if a system administrator updates access control list 112 to modify the job title attribute of existing employee, Eric, to a Database Administrator (DBA), then intelligent access control program 114 detects alterations to the job title of Eric by monitoring access control list 112. An access control list corresponding to the example is illustrated below by Table 1:

TABLE 1

| Employee | Department ($G'_1$) | Job Title ($G'_2$) | DB123 ($A_1$) | DB456 ($A_2$) | SVN123 ($A_3$) |
|---|---|---|---|---|---|
| Abe | D1 | DBA | YES | YES | NO |
| Ben | D2 | DBA | YES | YES | NO |
| Carl | D1 | IT Specialist | NO | YES | YES |
| Dan | D1 | IT Specialist | NO | YES | YES |
| Eric | D1 | DBA | ? | ? | ? |

In the example represented by Table 1 above, the cells within the Employee column list the employee profiles stored in access control list 112, such as Abe and Ben. The cells within the columns labeled $G'_n$ detail a category of attributes possessed by each of the employees listed—for example, employees within the column $G'_2$ (category Job Title) may be attributed as a DBA or IT Specialist. Employees who share the same attribute within column $G'_n$ are grouped together to form groups $G_n$ (described in more detail below). In addition, cells within columns labeled $A_n$ denote whether a user has access to the corresponding asset—for example, Abe and Ben have access to $A_1$ (DB123) denoted by the "YES" in the corresponding cells, however Carl and Dan do not.

Intelligent access control program 114 identifies groups of users with whom the new/modified user shares attributes by referencing $G'_n$ in access control list 112 (step 204). In the example embodiment, $G'_n$ details a category of attributes of all users, like or dislike, such that intelligent access control program 114 can create groups of users that match the attribute defined by column $G'_1$, $G'_2$, . . . $G'_n$ to those of the new/modified user, into corresponding groups $G_1$, $G_2$, $G_3$ . . . $G_n$. In the example embodiment, intelligent access control program 114 determines which attributes have been associated with a new/modified user, such as department or job title, and compares it to the attributes of existing users. Intelligent access control program 114 generates groups ($G_1$, $G_2$, $G_3$. . . $G_n$) of users (not including the new/modified user) who possess similar attributes to the new/modified user. In the example embodiment, a group ($G_1$, $G_2$, $G_3$. . . $G_n$) is generated for each known attribute of the new/modified user based on the information contained in columns $G'_n$. Referencing $G'_1$ of Table 1 above, if intelligent access control program 114 determines that Eric (the new user) is within Department 1, then intelligent access control program 114 generates the group $G_1$ of employees comprising Abe, Carl, and Dan because Abe, Carl, and Dan by referencing $G'_1$ for employees who also are within Department 1. Note that the group is based on the attribute of the new/modified employee (Eric), thus $G_1$ is based on Department 1. Further note that Ben, while included in $G'_1$, is not included in $G_1$ because he is in Department 2 rather than Department 1. Furthermore, if intelligent access control program 114 determines that new employee, Eric, has the job title of a Database Administrator (DBA), then intelligent access control program 114 references $G'_2$ to generate a group $G_2$ of employees consisting of Abe and Ben because Abe and Ben also have the job title of DBA.

Intelligent access control program 114 identifies the assets associated with each generated group by referencing access control list 112 (step 206). Assets are associated with a group if any members of the group have access to the asset. Referencing Table 1 above, if intelligent access control program 114 generates a group $G_1$ of employees who are all in Department 1, then intelligent access control program 114 references access control list 112 to determine that employees in Department 1 have access to assets DB123, DB456, and SVN123 (indicated by a "YES"/"NO"/"?" in the corresponding cell of Table 1). Furthermore, if intelligent access control program 114 generates a group $G_2$ of employees within the DBA job title, then intelligent access control program 114 references access control list 112 to determine that employees with the job title DBA are associated with assets DB123 and DB456.

Intelligent access control program 114 evaluates a correlation value between the groups identified in step 204 and the assets identified in step 206 (step 208). The correlation value is used to determine the ratio of users with access to a particular asset, $A_n$ that also belong to a particular group, $G_n$, to those not in group $G_n$. The higher the correlation value between users in a particular group and access to a particular asset, the more likely a user added to said group should also have access to said asset. Accordingly, in the example embodiment, the correlation value is synonymous with a confidence level corresponding to providing the new or modified user access to a particular asset. In order to determine the correlation value between asset $A_n$ and group $G_n$, intelligent access control program 114 applies Equation 1 shown below:

$$C(A_n G_n) = \frac{1}{2}\left[\frac{(|A_n \cap G_n| - |A_n \Delta G_n|)}{|A_n \cup G_n|} + 1\right] \quad (1)$$

Where:
C ($A_n G_n$)=correlation between employees with access to asset $A_n$ and group of employees $G_n$;
$|A_n \cap G_n|$=count of employees who have access to asset $A_n$ and are within group $G_n$;
$|A_n \Delta G_n|$=count of employees with access to either $A_n$ or $G_n$, but not both; and
$|A_n \cup G_n|$=count of employees with access to $A_n$ and/or $G_n$.

Figure 4:
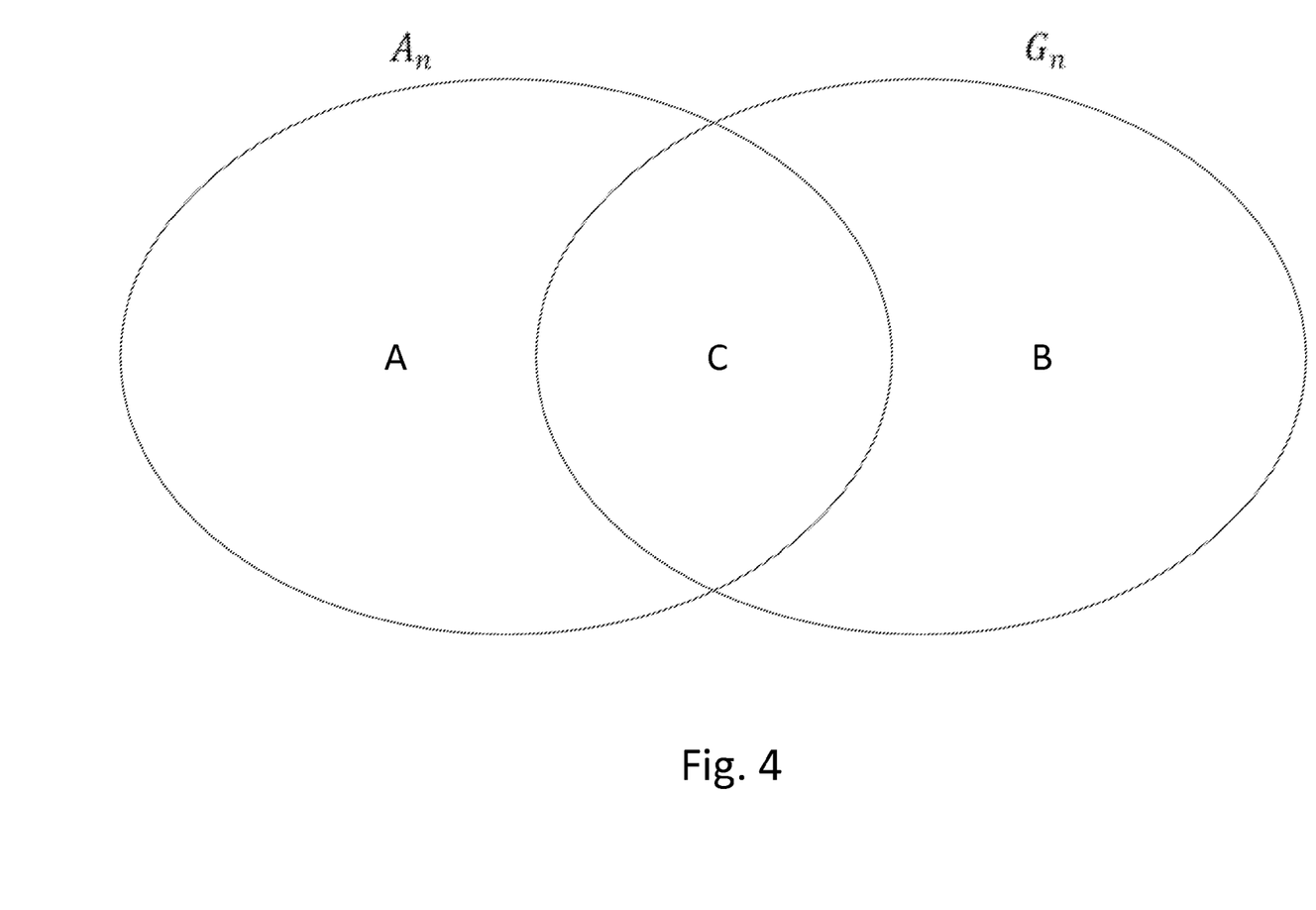
FIG. 4 is a Venn diagram illustrating the union, intersection, and delta of an intelligent access control system 100 of FIG. 1 utilized in determining a correlation value, in accordance with an embodiment of the invention.

The unions, deltas, and intersections of the variables used in Equation 1 are illustrated by the Venn diagram illustrated by FIG. 4. In the Venn diagram of FIG. 4:
$|A_n \cap G_n|=|\{C\}|=1$;
$|A_n \Delta G_n|=|\{A, B\}|=2$; and
$|A_n \cup G_n|=|\{A, B, C\}|=3$.

In the Venn diagram illustrated by FIG. 4, the intersection, represented by $\cap$, is based on the number of users who both correspond to the group of similarly attributed users ($G_n$)

and have access to the asset ($A_n$). The delta value, represented by $\Delta$, is based on the number of users who correspond to the group of similarly attributed users ($G_n$) but do not have access to the asset ($A_n$) and the number of users who have access to the asset ($A_n$) but do not correspond to the group of similarly attributed users ($G_n$). The union value, represented by $\cup$, is based on the number of users who either correspond to the group of similarly attributed users ($G_n$) or have access to the asset ($A_n$).

The resulting quotient of Equation 1 is normalized to result in a value between 0 and 1. The greater the correlation value (or confidence level), the more likely that a new/modified employee with attributes similar to existing employees in group $G_n$ should be provided access to asset A. Intelligent access control program 114 begins with asset $A_1$ and determines a correlation between $A_1$ and each corresponding group, $G_1, G_2, G_3 \ldots G_n$, until a confidence level has been determined for each group with respect to $A_1$. Intelligent access control program 114 repeats the process for $A_1, A_2, A_3 \ldots A_n$. Continuing the example above illustrated by Table 1, if intelligent access control program 114 evaluates the correlation between $A_1$ (DB123) and each corresponding group starting with $G_1$ (Department 1), then intelligent access control program 114 would calculate:

$|A_1 \cap G_1|=1$ (Abe has access to $A_1$ (DB123) and is within $G_1$ (Dept. 1));

$|A_1 \Delta G_1|=3$ (Ben, Carl, and Dan have access to either $A_1$ (DB123) or $G_i$ (Dept. 1), but not both);

$|A_1 \cup G_1|=4$ (Abe, Ben, Carl, and Dan have access to $A_1$ (DB123) and/or $G_1$ (Dept. 1)); and thus $$C(A_1 G_1) == \frac{1}{2}\left[\frac{(1-3)}{4} + 1\right] = \frac{1}{4} = 25\% \quad (2)$$

Therefore, there is a 25% correlation between employees with access to asset $A_1$ (DB123) and employees in $G_1$ (Department 1), indicating with a low confidence level that an employee added to Department 1 (Eric) should be provided access to $A_1$ (DB123) (note that the new/modified employee is not included in calculating a correlation value). Intelligent access control program 114 further evaluates the same asset $A_1$ (DB123) with the other identified groups $G_n$ of employees possessing similar attributes to the new/modified employee. Referencing Table 1 and Equation 1 again, intelligent access control program 114 determines whether Eric should be provided access to $A_1$ (DB123) again, this time based on $G_2$ (his position as a DBA):

$|A_1 \cap G_2|=2$ (Abe and Ben have access to $A_1$ (DB123) and are within $G_2$ (DBA));

$|A_1 \Delta G_2|=0$ (No employee has access to either $A_1$ (DB123) or $G_2$ (DBA), but not both);

$|A_1 \cup G_2|=2$ (Abe and Ben have access to $A_1$ and/or $G_2$ (DBA)); thus $$C(A_1 G_2) == \frac{1}{2}\left[\frac{(2-0)}{2} + 1\right] = \frac{2}{2} = 100\% \quad (3)$$

Therefore, there is a 100% correlation between employees with access to asset $A_1$ (DB123) and employees in $G_2$ (employees with the Job Title of DBA), indicating with a high certainty that employees working as a DBA (soon to be Eric) should be provided access to $A_1$ (DB123). Thus, in the present example and in regards to $A_1$ (DB123), Eric's position in Department 1 ($G_1$) warrants a 25% confidence level of providing access to DB123 while Eric's position as a DBA ($G_2$) warrants a 100% confidence level in providing Eric access to the same resource (DB123).

Intelligent access control program 114 evaluates a correlation between each asset and associated group until each asset has a correlation value for each associated group. Thus, in the example above, intelligent access control program 114 would now evaluate asset $A_2$ against applicable groups $G_1$, $G_2$, $G_3$, etc., then $A_3$ against applicable groups $G_1$, $G_2$, $G_3$, etc. until all assets have correlation values with the associated groups. Referencing Table 1 above, in order to determine whether Eric should be provided access to asset $A_2$ (DB456), intelligent access control program 114 calculates the correlation between $A_2$ and $G_1$:

$|A_2 \cap G_1|=3$ (Abe, Carl, and Dan have access to $A_2$ (DB456) and are within $G_1$ (Dept. 1));

$|A_2 \Delta G_1|=1$ (Ben has access to $A_2$ (DB456) or $G_1$ (Dept. 1), but not both);

$|A_2 \cup G_1|=4$ (Abe, Ben, Carl, and Dan have access to $A_2$ (DB456) and/or $G_1$ (Dept. 1)); thus $$C(A_2 G_1) == \frac{1}{2}\left[\frac{(3-1)}{4} + 1\right] = \frac{3}{4} = 75\% \quad (4)$$

Therefore, there is a 75% correlation between employees with access to DB456 who are within Department 1. Intelligent access control program 114 next evaluates the same asset $A_2$ using group $G_2$. Therefore, referencing Table 1 with regards to $A_2$ (DB456) and $G_2$ (DBA's):

$|A_2 \cap G_2|=2$ (Abe and Ben have access to $A_2$ (DB456) and are within $G_2$ (DBA's));

$|A_2 \Delta G_2|=2$ (Carl and Dan have access to $A_2$ (DB456) or $G_2$ (DBA's), but not both);

$|A_2 \cup G_2|=4$ (Abe, Ben, Carl, and Dan have access to $A_2$ (DB456) and/or $G_2$ (DBA's)); thus $$C(A_2 G_2) == \frac{1}{2}\left[\frac{(2-2)}{4} + 1\right] = \frac{1}{2} = 50\% \quad (5)$$

Therefore, there is a 50% correlation between employees with access to $A_2$ (DB456) and employees within $G_2$ (employees with the Job Title DBA). Thus, in the present example and in regards to asset $A_2$, Eric's position in Department 1 warrants a 75% confidence level of providing access to asset DB456 while Eric's position as a DBA warrants a 50% confidence level in providing Eric access to the same resource (DB456).

Intelligent access control program 114 determines whether any of the individual correlation values $C(A_n G_n)$ between a particular asset $A_n$ and any corresponding group $G_n$ is greater than or equal to a user-set threshold (decision 210). In the example embodiment, intelligent access control program 114 determines whether the correlation between a particular asset and each group of similarly attributed employees is greater than or equal to 75%, while in other embodiments, the user-set threshold may be a different value. Thus, continuing the example illustrated by Table 1 above, if intelligent access control program 114 determines that $C(A_1 G_1)$ is 25% and $C(A_1 G_2)$ is 100%, then intelligent access control program 114 compares both the 25% correlation value and the 100% correlation value to the user-set threshold of 75% individually. In other embodiments, intelligent access control program 114 may compare an averaged (overall) correlation value (62.5%) to the user-set threshold.

In other embodiments which average the correlation values, if intelligent access control program 114 determines that $C(A_1G_1)$ is 25% and $C(A_1G_2)$ is 100%, then intelligent access control program 114 compares a 62.5% correlation value to the user-set threshold of 75%30 . In further embodiments, a system administrator may apply weights to the correlation value of specific groups such that specific groups have more significance than others in a weighted average.

If intelligent access control program 114 determines that any of the correlation values between a particular asset and any corresponding group is equal to or exceeds 75% (decision 210 "YES" branch), then intelligent access control program 114 grants the new/modified user access to the asset (step 212). In the example embodiment, it is only necessary that an individual correlation between a particular asset and one of the corresponding groups exceed the user-set threshold ($C(A_1G_n)>=0.75$). Continuing the example illustrated by table 1, if intelligent access control program 114 compares both the 25% correlation value and the 100% correlation value to the user-set threshold of 75%, then intelligent access control program 114 would provide Eric access to $A_1$ (DB123) because $C(A_1G_2)>=75\%$. Conversely, in the other embodiments where an average correlation value is used ($C(A_1)=62.5\%$), Eric would not be provided access to $A_1$ (DB123) because $C(A_1G_{Ave.})<=75\%$. In the example embodiment, an employee is provided access to an asset by specifying so in access control list 112.

If intelligent access control program 114 determines that the correlation value does not equal nor exceed 75% (decision 210 "NO" branch), then intelligent access control program 114 determines whether the correlation value is greater than or equal to 50% (decision 214). The comparison is performed in the same manner as described by decision 210.

If intelligent access control program 114 determines that the correlation value does not equal nor exceed 50% (decision 214 "NO" branch), then intelligent access control program 114 denies and/or revokes the employee's access to the particular asset (step 218). Intelligent access control program 114 adds, revokes, or otherwise modifies user access to an asset by modifying access control list 112. In regards to an asset, access is denoted within access control list 112 by a "YES" or a "NO". If the user has not yet been evaluated for access to assets, access may be represented by a "?". Modifying access control list 112 is performed by editing the cells corresponding to a user and asset to reflect the determination by intelligent access control program 114. In the example above, if intelligent access control program 114 determines that the correlation value between DB123 and Job Title DBA is less than fifty percent ($C(A_1G_2)<50\%$), then intelligent access control program 114 modifies the cell corresponding to Erik and DB123 to a "NO" in access control list 112. Note, however, that if another group to which Erik is a member has a correlation greater than 50% with DB123, such as $C(A_1G_1)$, it may negate the denying of access based on $C(A_1G_2)$.

If intelligent access control program 114 determines that the correlation value is equal to or exceeds 50% (decision 210 "YES" branch), then intelligent access control program 114 notifies a system administrator (step 216). Because the correlation value is not strong enough in favor of nor against providing an employee access to an asset, the decision is passed to a system administrator for a final decision regarding employee access to the asset.

Figure 3:
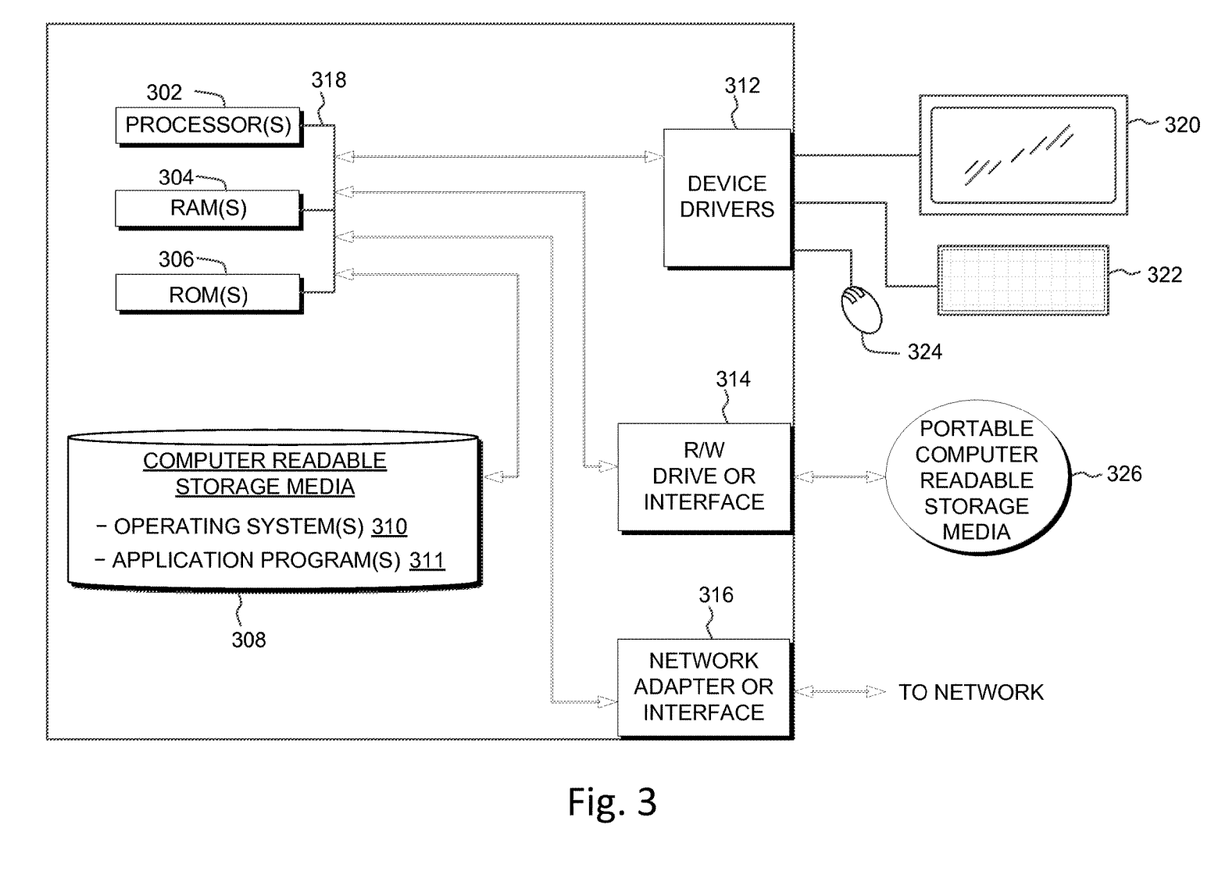
FIG. 3 is a block diagram depicting the hardware components of an intelligent access control system of FIG. 1, in accordance with an embodiment of the invention.

FIG. 3 depicts a block diagram of components of computing device 110 of an intelligent access control system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, intelligent access control program 114, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for intelligent access control, the method comprising:
   detecting a modification to an attribute associated with a first user;
   identifying a first group of users, wherein the first group of users corresponds to one or more users who are associated with the attribute associated with the first user;
   determining an asset associated with the first group of users, wherein access to the asset is detailed in an access control list;
   determining a first correlation value between the first group of users and the asset; and
   based on at least the first correlation value, determining whether to modify the access control list,
   wherein one or more steps of the above method are performed using one or more computers.

2. The method of claim 1, wherein determining the first correlation value between the first group of users and the asset further comprises:
   determining an intersection value, wherein the intersection value is based, at least in part, on a number of users who both correspond to the first group of users and have access to the asset;
   determining a delta value, wherein the delta value is based, at least in part, on a number of users who correspond to the first group of users but do not have access to the asset and a number of users who have access to the asset but do not correspond to the first group of users; and
   determining a union value, wherein the union value is based, at least in part, on a number of users who at least one of correspond to the first group of users and have access to the asset.

3. The method of claim 1, wherein determining whether to modify the access control list further comprises:
   based on the first correlation value being greater than a first threshold value, modifying the access control list to detail that the first user may access the asset.

4. The method of claim 1, wherein determining whether to modify the access control list further comprises:
   based on the first correlation value being less than a first threshold value, determining whether the first correlation value is less than a second threshold value; and
   based on the first correlation value being less than the second threshold value, modifying the access control list to detail that the first user may not access the asset.

5. The method of claim 1, wherein determining whether to modify the access control list further comprises:
   based on the first correlation value being greater than a second threshold value, transmitting the first correlation value to a system administrator.

6. The method of claim 1, further comprising:
   identifying a second group of users, wherein the second group of users corresponds to one or more users who are associated with a second attribute associated with the first user;
   determining whether at least one of the one or more users corresponding to the second group of users has access to the asset;
   based on determining that at least one of the one or more users corresponding to the second group of users has access to the asset, determining a second correlation value between the second group of users and the asset; and
   determining an overall correlation value by calculating an average of the first correlation value and the second correlation value.

7. The method of claim 6, wherein the step of determining whether to modify the access control list is based on the overall correlation value.

8. A computer program product for intelligent access control, the computer program product comprising:
   one or more computer-readable storage media and program instructions stored on the one or more computer-readable storage media, the program instructions comprising:
   program instructions to detect a modification to an attribute associated with a first user;
   program instructions to identify a first group of users, wherein the first group of users corresponds to one or more users who are associated with the attribute associated with the first user;
   program instructions to determine an asset associated with the first group of users, wherein access to the asset is detailed in an access control list;
   program instructions to determine a first correlation value between the first group of users and the asset; and
   based on at least the first correlation value, program instructions to determine whether to modify the access control list.

9. The computer program product of claim 8, wherein program instructions to determine the first correlation value between the first group of users and the asset further comprises:
   program instructions to determine an intersection value, wherein the intersection value is based, at least in part, on a number of users who both correspond to the first group of users and have access to the asset;
   program instructions to determine a delta value, wherein the delta value is based, at least in part, on a number of users who correspond to the first group of users but do not have access to the asset and a number of users who have access to the asset but do not correspond to the first group of users; and
   program instructions to determine a union value, wherein the union value is based, at least in part, on a number of users who at least one of correspond to the first group of users and have access to the asset.

10. The computer program product of claim 8, wherein program instructions to determine whether to modify the access control list further comprises:
    based on the first correlation value being greater than a first threshold value, program instructions to modify the access control list to detail that the first user may access the asset.

11. The computer program product of claim 8, wherein program instructions to determine whether to modify the access control list further comprises:
    based on the first correlation value being less than a first threshold value, program instructions to determine whether the first correlation value is less than a second threshold value; and
    based on the first correlation value being less than the second threshold value, program instructions to modify the access control list to detail that the first user may not access the asset.

12. The computer program product of claim 8, wherein program instructions to determine whether to modify the access control list further comprises:
  based on the first correlation value being greater than a second threshold value, program instructions to transmit the first correlation value to a system administrator.

13. The computer program product of claim 8, further comprising:
  program instructions to identify a second group of users, wherein the second group of users corresponds to one or more users who are associated with a second attribute associated with the first user;
  program instructions to determine whether at least one of the one or more users corresponding to the second group of users has access to the asset;
  based on determining that at least one of the one or more users corresponding to the second group of users has access to the asset, program instructions to determine a second correlation value between the second group of users and the asset; and
  program instructions to determine an overall correlation value by calculating an average of the first correlation value and the second correlation value.

14. The computer program product of claim 13, wherein program instructions to determine whether to modify the access control list is based on the overall correlation value.

15. A computer system for intelligent access control, the computer system comprising:
  one or more computer processors, one or more computer-readable storage media, and program instructions stored on one or more of the computer-readable storage media for execution by at least one of the one or more processors, the program instructions comprising:
  program instructions to detect a modification to an attribute associated with a first user;
  program instructions to identify a first group of users, wherein the first group of users corresponds to one or more users who are associated with the attribute associated with the first user;
  program instructions to determine an asset associated with the first group of users, wherein access to the asset is detailed in an access control list;
  program instructions to determine a first correlation value between the first group of users and the asset; and
  based on at least the first correlation value, program instructions to determine whether to modify the access control list.

16. The computer system of claim 15, wherein program instructions to determine the first correlation value between the first group of users and the asset further comprises:
  program instructions to determine an intersection value, wherein the intersection value is based, at least in part, on a number of users who both correspond to the first group of users and have access to the asset;
  program instructions to determine a delta value, wherein the delta value is based, at least in part, on a number of users who correspond to the first group of users but do not have access to the asset and a number of users who have access to the asset but do not correspond to the first group of users; and
  program instructions to determine a union value, wherein the union value is based, at least in part, on a number of users who at least one of correspond to the first group of users and have access to the asset.

17. The computer system of claim 15, wherein program instructions to determine whether to modify the access control list further comprises:
  based on the first correlation value being greater than a first threshold value, program instructions to modify the access control list to detail that the first user may access the asset.

18. The computer system of claim 15, wherein program instructions to determine whether to modify the access control list further comprises:
  based on the first correlation value being less than a first threshold value, program instructions to determine whether the first correlation value is less than a second threshold value; and
  based on the first correlation value being less than the second threshold value, program instructions to modify the access control list to detail that the first user may not access the asset.

19. The computer system of claim 15, further comprising:
  program instructions to identify a second group of users, wherein the second group of users corresponds to one or more users who are associated with a second attribute associated with the first user;
  program instructions to determine whether at least one of the one or more users corresponding to the second group of users has access to the asset;
  based on determining that at least one of the one or more users corresponding to the second group of users has access to the asset, program instructions to determine a second correlation value between the second group of users and the asset; and
  program instructions to determine an overall correlation value by calculating an average of the first correlation value and the second correlation value.

20. The computer system of claim 19, wherein program instructions to determine whether to modify the access control list is based on the overall correlation value.

* * * * *